United States Patent Office 3,708,484
Patented Jan. 2, 1973

3,708,484
AMINO AND SUBSTITUTED AMINO-s-TRIAZOLO-[4,3-b]-PYRIDAZINES
Paul L. Anderson, Dover, and William J. Houlihan and Robert E. Manning, Mountain Lakes, N.J., assignors to Sandoz-Wander, Inc., Hanover, N.J.
No Drawing. Filed Oct. 16, 1970, Ser. No. 81,522
Int. Cl. C07d 51/04
U.S. Cl. 260—250 A        3 Claims

ABSTRACT OF THE DISCLOSURE

Amino and substituted amino-s-triazolo-[4,3-b]-pyridazines, e.g., 8-allylamino-3-amino-6-chloro-s-triazolo-[4,3-b]-pyridazine, exhibit anti-depressant and anti-inflammatory activity and are prepared by treating 4-amino and substituted amino-3-hydrazino pyridazines or 4-amino and substituted amino-6-hydrazino pyridazines with cyanogen halide.

---

This invention relates to amino and substituted amino derivatives of s-triazolo-[4,3-b]-pyridazines, their method of preparation and their use as anti-depressant and anti-inflammatory agents.

The compounds of this invention may be represented by the following formula:

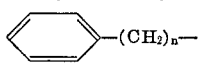

(I)

where $R_1$ is hydrogen or halo having an atomic weight of about 35 to 80, and $R_2$ is hydrogen, lower alkyl, i.e., lower alkyl having 1 to 5 carbon atoms, e.g., methyl, ethyl, isopropyl, and the like; lower alkenyl, i.e., lower alkenyl having 3 to 5 carbon atoms, e.g., allyl, methallyl and the like or

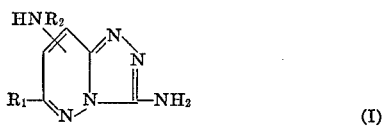

where $n$ is 0, 1 or 2,
and pharmaceutically acceptable acid addition salts thereof.

The compounds of Formula I are prepared in accordance with the following reaction scheme:

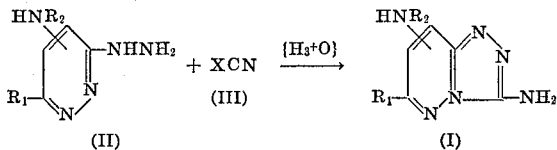

where

X is halo having an atomic weight of about 35 to 80, and $R_1$ and $R_2$ are as defined above.

The compounds of Formula I are prepared by treating a compound of Formula II with a cyanogen halide (III) in an acidic hydroxylic solvent. The preferred cyanogen halide for use in the reaction is cyanogen bromide. The acidity is preferably provided through the use of a carboxylic acid having 1 to 4 carbon atoms, e.g., acetic acid, propionic acid and the like, especially acetic acid, although dilute mineral acids such as hydrochloric or sulfuric acid can also be used. Where carboxylic acid is used, it is desirable to add a small amount of a sodium or potassium salt of the carboxylic acid to the reaction mixture. The preferred temperature range is 0° to 50° C., especially an inert water soluble solvent such as the lower alkanols, especially ethanol, can also be used. The temperature at which the reaction is carried out is not critical, but the preferred temperature range is 00 to 506 C., especially 20° to 30° C. The product is recovered by conventional methods, e.g., filtration.

The compounds of Formula II wherein $R_1$ is halo having an atomic weight of about 35 to 80 having the Formula IIa:

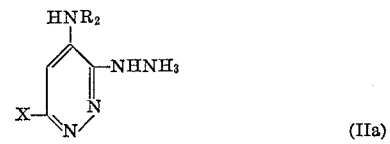

(IIa)

and IIb:

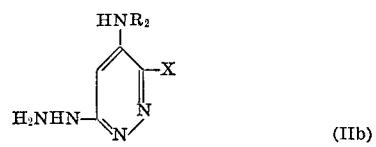

(IIb)

where

X is halo of atomic weight between about 35 to 80; and $R_2$ is as defined above are prepared simultaneously by treating a compound of Formula IV

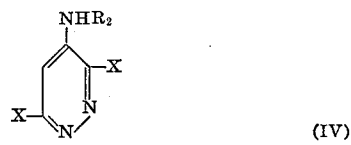

(IV)

in which X and $R_2$ are as defined above and each X is the same, with hydrazine.

Although the temperature is not critical, the reaction is suitably carried out at a temperature of about 20° to 115° C., preferably between about 60° to 115° C., and especially between about 80° to 115° C. The use of solvent is not necessary, although excess hydrazine or inert solvents such as lower alkanol, especially methanol or ethanol may be used if desired.

The resulting compounds of Formula IIa and IIb may be recovered using conventional techniques, e.g., fractional crystallization. The use of excess hydrazine sometimes facilitates separation of the co-products of the reaction as some of the compounds of Formula IIa precipitates on cooling the reaction mixture. Compound IIb remains in solution and is isolated by conventional techniques, e.g., fractional precipitation using water as the diluent.

Compounds of Formula II in which $R_1$ is hydrogen are prepared according to the following reaction scheme:

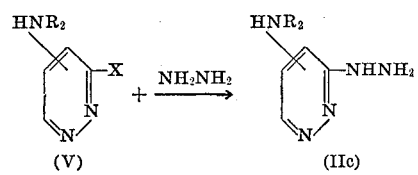

where X and $R_2$ are as defined above.

The compounds (IIc) are prepared by treating pyridazines (V) with hydrazine. Although the temperature is not critical, the reaction is generally carried out at about 20° to 115° C., preferably between about 60° to 115° C. and especially between about 80° to 115° C. Use of a solvent is not necessary, but excess hydrazine or inert solvents in particular lower alkanols especially methanol or ethanol may be used if desired. The product (Ic) is isolated by conventional techniques, e.g., fractional crystallization.

Compounds of Formula V are prepared according to the following reaction scheme:

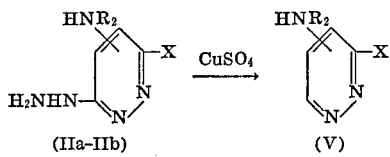

(IIa–IIb)    (V)

where X and $R_2$ are as defined above.

The compounds of Formula V are prepared by treating the hydrazinopyridazine (IIa–IIb) with copper sulfate at a temperature of 50° to 100° C. for 1 to 24 hours, in an inert solvent, i.e., one which does not react with any of the reactants or the product. The temperature is not critical. The preferred solvent is alcohol-water especially 1:1 alcohol-water where the alcohol has 1 to 5 carbon atoms. The product (V) is isolated by convention methods, e.g., fractional crystallization.

The compounds of Formula II in which $R_2$ is other than lower alkenyl and $R_1$ is hydrogen can also be prepared from compound (IIa–IIb) according to the following reaction scheme:

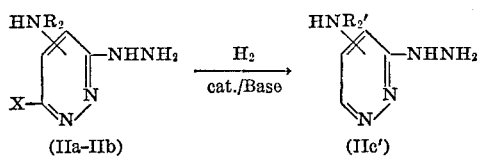

(IIa–IIb)    (IIc′)

where X and $R_2$ are as defined above and $R'_2$ has the same significance as $R_2$ except that it does not include lower alkenyl.

It will be understood that during the hydrogenation, the double bond of the alkenyl substituent is reduced thereby transforming $R_2$ into $R'_2$ as indicated in the reaction scheme.

The compounds (IIc′) may be prepared by hydrogenating compounds of Formula IIa–IIb in the presence of a hydrogenation catalyst and alkali metal base in an inert solvent. The hydrogenation catalyst is preferably a platinum or palladium catalyst especially 10% platinum or palladium on carbon. The preferred alkali metal bases are sodium hydroxide and potassium hydroxide. The inert solvents preferred are the lower alcohols, especially methanol, ethanol, or isopropyl alcohol; aromatic solvents, particularly benzene and toluene, and ethers especially tetrahydrofuran. The temperature of the reaction and the pressure of the hydrogen are not critical in the hydrogenation. The process can be carried out at a temperature of about 0° to 50° C., preferably 20° to 30° C., especially between 20° and 25° C. The hydrogenation is carried out preferably at pressures which vary from about 14 p.s.i. (about 1 atmosphere) to about 50 p.s.i. Compounds (Ic′) are recovered by conventional techniques, e.g., by evaporation and recrystallization by salt formation and precipitation.

The compounds of Formula IV may be prepared according to the following scheme:

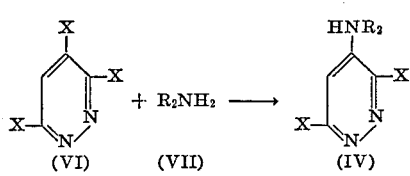

(VI)    (VII)    (IV)

where X and $R_2$ are as defined above, and each X is the same.

The pyridazines (IV) are prepared by treating 3,4,6-trihalopyridazine (VI) with an appropriate amine (VII). Although the temperature is not critical, the reaction is normally carried out at a temperature between about 0° to 100° C., preferably between about 20° to 80° C., more preferably 20° to 30° C. Although not necessary, inert solvents may be used, preferably lower alkanols, especially methanol, ethanol and isopropanol. When feasible, excess reactant (VII) may also be used as solvent. The compounds (IV) are recovered using conventional techniques, e.g., evaporation or crystallization.

The compounsd of Formula H are novel and are the subject of a separate application. The compounds of Formula III and VI and many of the compounds of Formula IV, V and VII are known and are prepared according to methods disclosed in the literature. The compounds of Formula IV, V and VII which are not known can be prepared by analogous methods from known materials.

The compounds of Formula I are useful because they possess pharmacological activity in animals. More particularly, the compounds of Formula I are useful as anti-depressant agents as indicated by their activity in mice given parenterally 25.6 mg./kg. of body weight of active material. The test method used is basically as described by Spencer, P.S.J., Antagonism of Hypothermia in the Mouse by Anti-Depressants, in Anti-Depressant Drugs, pp. 194–204, Eds. S. Garattini and M.N.G. Dukes, Excerpta Medics Foundation, 1967.

The compounds of Formula I are also useful as anti-inflammatory agents as indicated by their activity in rats given 82 mg./kg. of active compound orally and tested using the acute carrageenan-induced edema procedure substantially as described by Winter (Proc. Soc. Exptl. Biol., 111:544, 1962).

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds I may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzensulfonate, and the like.

In general, satisfactory results are obtained when the compounds are administered as anti-depressants at a daily dosage of from about 1.0 to 100 milligrams per kilogram of animal body weight. This daily dosage is preferably given in divided doses, e.g., 2 to 4 times a day, or in sustained release form. For most large animals, the total daily dosage is from about 75 to 1000 milligrams and dosage forms suitable for internal administration comprise from about 18.75 to 500 milligrams of the compound in admixture with a solid or liquid pharmaceutical carrier or diluent.

When the compounds of Formula I are used as anti-inflammatory agent, satisfactory results are obtained at a daily dosage of about 5 milligrams to about 200 milligrams per kilogram of animal body weight. This daily dosage is preferably administered 2 to 4 times a day, or in sustained release form. For most large animals, such as primates, the total daily dosage is from about 350 milligrams to 2500 milligrams. Dosage forms suitable for internal use comprise from about 87.5 milligrams to about 1,250 milligrams of the active compound in intimate admixture with a solid or liquid pharmaceutically acceptable carrier or diluent.

A representative formulation suitable for oral administration is a capsule prepared by standard encapsulating techniques which contains the following:

| Ingredient: | Parts by wt. |
|---|---|
| 8 - allylamino - 6-chloro-s-triazolo-[4,3-b]-pyridazine hydrochloride | 100 |
| Inert filler (starch, kaolin, lactose) | 200 |

EXAMPLE 1

8-allylamino-3-amino-6-chloro-s-triazolo[4,3-b]-pyridazine hydrochloride

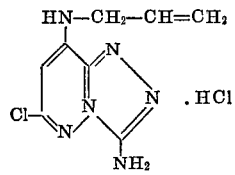

Step A.—3,6-dichloro-4-allylamino pyridazine: To a stirred solution of 91.7 g. of 3,4,6-trichloropyridazine in 1000 ml. of ethanol is added slowly with cooling 85.9 g. of allylamine. After stirring for 2 hours at room temperature, the mixture is cooled and the resultant precipitate 3,6-dichloro-4-allylamino pyridazine is collected by filtration. Concentration of the filtrate to 200 ml. gives a second crop and concentration to 100 ml. gives a third crop; M.P. 95° to 98° C.

When the above process is carried out and an equivalent amount of ammonia, ethylamine, aniline or benzylamine is used in place of the allylamine, there is obtained 3,6-dichloro - 4-aminopyridazine, 3,6-dichloro-4-ethylamino-pyridazine, 3,6 - dichloro - 4-anilinopyridazine or 3,6-dichloro-4-benzylaminopyridazine, respectively.

Step B.—4-allylamino-6-chloro-3-hydrozino pyridazine:

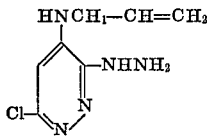

To 30.5 g. of 3,6-dichloro-4-allylaminopyridazine is added with stirring 150 ml. of 97% hydrazine solution. The mixture is refluxed for 3 hours, then cooled and the precipitate collected by filtration. Further cooling gives a second crop. Recrystallization from methanol gives 4-allylamino-6-chloro-3-hydrazino pyridazine; M.P. 184°–186° C.

The base is dissolved in methanol and hydrogen chloride gas is bubbled through the solution for ½ hour at room temperature. The product 4-allylamino-6-chloro-3-hydrazinopyridazine dihydrochloride (M.P. 199° to 202° C.) precipitates upon evaporation and is recovered by filtration.

Following the above procedure but using an equivalent amount of 3,6-dichloro-4-aminopyridazine
3,6-dichloro-4-ethylaminopyridazine
3,6-dichloro-4-anilinopyridazine or
3,6-dichloro-4-benzylaminopyridazine in place of the 4-allylamino-6-chloro-4-hydrazinopyridazine used therein, there is obtained the dihydrochloride salt of 4-amino-6-chloro-3-hydrazopyridazine
4-ethylamino-6-chloro-3-hydrazinopyridazine
4-phenylamino-6-chloro-3-hydrazinopyridazine or
4 - benzylamino - 6-chloro-3-hydrazinopyridazine, respectively.

Step C.—8 - allylamino - 3 - amino-6-chloro-s-triazolo-[4,3-b]-pyridazine hydrochloride: To 8.8 g. of 5-allylamino - 6 - chloro-3-hydrozinopyridazine dihydrochloride and 9.6 g. of sodium acetate dissolved in 125 cc. of water is added 35 cc. of glacial acetic acid. This solution is cooled in an ice bath and 4 g. of cyanogen bromide dissolved in 60 cc. of 95% ethanol is added dropwise with stirring. The reaction mixture is stirred for 1.5 hours. The room temperature and then refrigerated for 16 hours. The resultant precipitate is filtered and washed with water. The product obtained is 8-allylamino-3-amino-6-chloro-s-triazolo-[4,3-b]-pyridazine, M.P. 248°–249° C.

Though 6.37 of this product suspended in 500 c. of methanol, hydrogen chloride gas is bubbled with cooling for 20 minutes. The product, 8 - allylamino-3-amino-6-chloro-s-triazolo-[4,3-b]-pyridazine hydrochloride (M.P. 243°–245° C.) precipitates and is recovered by filtration.

Following the above procedure but using an equivalent amount of the dihydrochloride salt of 4-amino-6-chloro-3-hydrazinopyridazine
4-ethylamino-6-chloro-3-hydrazinopyridazine
4-phenylamino-6-chloro-3-hydrazinopyridazine or
4-benzylamino-6-chloro-3-hydrazinopyridazine in place of the 4-allylamino-6-chloro-3-hydrazinopyridazine dihydrochloride used therein, there is obtained 3,8-diamino-6-chloro-s-triazolo-[4,3-b]-pyridazine hydrochloride
3-amino-8-ethylamino-6-chloro-s-triazolo-[4,3-b]-pyridazine hydrochloride
3-amino-8-phenylamino-6-chloro-s-triazolo-[4,3-b]-pyridazine hydrochloride or
3-amino-8-benzylamino-6-chloro-s-triazolo-[4,3-b]-pyridazine hydrochloride, respectively.

EXAMPLE 2

7-allylamino-3-amino-6-chloro-s-triazolo-[4,3-b]-pyridazine hydrochloride

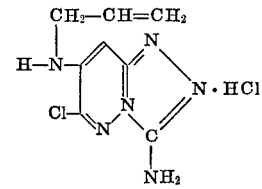

Step A.—4 - allylamino-3-chloro-6-hydrazinopyridzine dihydrochloride: After removing the precipitated 4-allylamino-6-chloro-3-hydrazino-pyridazine in Step B of Example 1 and washing with a small amount of water, the wash water is added to the filtrate to precipitate any residual 4-allylamino-6-chloro-3-hydrazinopyridazine remaining in the filtrate. The second precipitate is removed and additional water is then added to precipitate 4-allylamino-3-chloro-6-hydrazinopyridazine.

The free base is dissolved in methanol and treated with hydrogen chloride gas for 35 minutes at room temperature. The majority of the methanol is removed by evaporation and the product, 4-allylamino-3-chloro-6-hydrazino-pyridazine dihydrochloride, is precipitated by adding a small amount of ether.

When the filtrate from the preparation of 4-amino-6-chloro-3-hydrazinopyridazine,
4-ethylamino-6-chloro-3-hydrazinopyridazine,
4-anilino-6-chloro-3-hydrazinopyridazine or
4-benzylamino-6-chloro-3-hydrazinopyridazine, is used in place of the filtrate from the preparation of 4-allylamino - 6-chloro-3-hydrazinopyridazine in the above process, the dihydrochloride salt of 4-amino-3-chloro-6-hydrazinopyridazine,
4-ethylamino-3-chloro-6-hydrazinopyridazine,
4-anilino-3-chloro-6-hydrazinopyridazines or
4-benzylamino-3-chloro-6-hydrazinopyridazine, respectively, is obtained.

Step B.—7 - allylamino - 3-amino-6-chloro-s-triazolo-[4,3-b]-pyridazine hydrochloride: Following the procedure of Step C of Example 1 but using an equivalent amount of the dihydrochloride salt of 4-allylamino-3-chloro-6-hydrazinopyridazine,
4-amino-3-chloro-6-hydrazinopyridazine,
4-ethylamino-3-chloro-6-hydrazinopyridazine,
4-phenylamino-3-chloro-6-hydrazinopyridazine or
4-benzylamino-3-chloro-6-hydrazinopyridazine in place of the 4-allylamino-6-chloro-3-hydrazinopyridazine dihydrochloride used therein, there is obtained 7-allylamino-3-amino-6-chloro-s-triazolo-[4,3-b]-pyridazine hydrochloride,
3,7-diamino-6-chloro-s-triazolo-[4,3-b]-pyridazine hydrochloride,
3-amino-7-ethylamino-6-chloro-s-triazolo-[4,3-b]-pyridazine hydrochloride,
3-amino-7-phenylamino-6-chloro-s-triazolo-[4,3-b]-pyridazine hydrochloride or
3-amino-7-benzylamino-6-chloro-s-triazolo-[4,3-b]-pyridazine hydrochloride, respectively.

EXAMPLE 3

3,8-diamino-s-triazolo-[4,3-b]-pyridazine hydrochloride

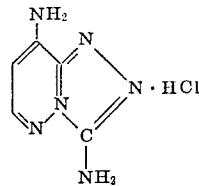

Step A.—4-amino-3-hydrazinopyridazine: A solution of 20 g. of 4-amino-6-chloro-3-hydrazinopyridazine prepared as described in Step B of Example 1 in 1000 ml. of methanol and 3 ml. of 0.5 N sodium hydroxide in methanol are charged into a Paar shaker. To this solution, 10 g. of 10% palladium on carbon catalyst is added. The Paar shaker is charged at room temperature with hydrogen to an initial pressure of 50 p.s.i. and shaken. After about 4 hours, the reaction mixture is filtered, the solvent evaporated, and the residue extracted with chloroform. The chloroform solution is evaporated to dryness, and 4-amino-3-hydrazinopyridazine obtained is dissolved in methanol. Hydrogen chloride gas is bubbled in, and the 4-amino-3-hydrazinopyridazine dihydrochloride (M.P. 281–283° C.) which precipitates is separated by filtration.

Following the above process but using an equivalent amount of 4-ethylamino-6-chloro-3-hydrazinopyridazine,
4-phenylamino-6-chloro-3-hydrazinopyridazine or
4-benzylamino-6-chloro-3-hydrazinopyridazine prepared according to the process of Step A of Example 2, 1 or an equivalent amount of 4-amino-3-chloro-6-hydrazinopyridazine,
4-ethylamino-3-chloro-6-hydrazinopyridazine,
4-phenylamino-3-chloro-6-hydrazinopyridazine or
4-benzylamino-3-chloro-6-hydrazinopyridazine prepared according to the process of Step of Example 2, in place of the 4 - amino-6-chloro-3-hydrazinopyridazine used therein, there is obtained the dihydrochloride salt of 4-ethylamino-3-hydrazinopyridazine,
4-phenylamino-3-hydrazinopyridazine,
4-benzylamino-3-hydrazinopyridazine,
5-amino-3-hydrazinopyridazine,
5-ethylamino-3-hydrazinopyridazine,
5-phenylamino-3-hydrazinopyridazine or
5-benzylamino-3-hydrazinopyridazine, respectively.

Step B.—2,8-diamino-s-triazolo-[4,3-b]-pyridazine hydrochloride: Following the procedure of Step C of Example 1 but using an equivalent amount of the dihydrochloride salt of 4-amino-3-hydrazinopyridazine,
4-ethylamino-3-hydrazinopyridazine,
4-phenylamino-3-hydrazinopyridazine,
4-benzylamino-3-hydrazinopyridazine,
5-amino-3-hydrazinopyridazine,
5-ethylamino-3-hydrazinopyridazine,
5-phenylamino-3-hydrazinopyridazine,
5-benzylamino-3-hydrazinopyridazine, in place of the 4-allylamino-6-chloro-3-hydrazinopyridazine dihydrochloride used therein, there is obtained.

3,8-diamino-s-triazolo-[4,3-b]-pyridazine hydrochloride,
3-amino-8-ethylamino-s-triazolo-[4,3-b]-pyridazine hydrochloride,
3-amino-8-phenylamino-s-triazolo-[4,3-b]-pyridazine hydrochloride,
3-amino-8-benzylamino-s-triazolo-[4,3-b]-pyridazine hydrochloride,
3,7-diamino-s-triazolo-[4,3-b]-pyridazine hydrochloride,
3-amino-7-ethylamino-s-triazolo-[4,3-b]-pyridazinehydrochloride,
3-amino-7-phenylamino-s-triazolo-[4,3-b]-pyridazine hydrochloride or
3-amino-7-benzylamino-s-triazolo-[4,3-b]-pyridazine hydrochloride, respectively.

EXAMPLE 4

8-allylamino-3-amino-s-triazolo-[4,3-b]-pyridazine hydrochloride

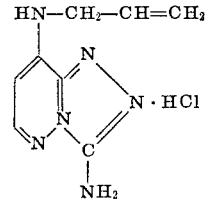

Step A.—4-allylamino - 3 - hydrazinopyridazine dihydrochloride: Into a 5 liter flask equipped with a heating mantle and stirrer are charged under nitrogen 50 g. of 4 - allylamino - 3 - chloro - 6 - hydrazinopyridazine, prepared according to the procedure of Step A. of Example 2, 1500 ml. of water and 1000 ml. of methanol. The mixture is heated to 70° C. and stirred until dissolution takes place. To this solution is added slowly 237 g. of $$CuSO_4 \cdot 5H_2O$$

dissolved in 1000 ml. of water. The reactants are refluxed for 3 hours at 85° C. The pH of the solution is adjusted to 8.0 with 2 N sodium hydroxide and the reaction mixture is filtered to remove copper oxide. The pH of the filtrate is readjusted to 4 with glacial acetic acid and evaporated to dryness.

The crude product is dissolved in 750 ml. of methanol and 750 ml. of water by heating to 60° C. The pH of the solution is adjusted to about 11 with 2 N NaOH and the solution is filtered to remove residual copper oxide. The pH of the filtrate is reduced to about 4 with glacial acid and the solvent is removed by evaporation. The residue is extracted with 200, and 100 ml. portions of acetone, which are combined and filtered to remove sodium acetate. The acetone is removed by evaporation and the residue recrystallized from methanol. The product is 3-chloro-4-allylaminopyridadine.

14 g. of 3-chloro-4-allylaminopyridazine is added to 250 ml. of hydrazine and the mixture is stirred under nitrogen for 17.5 hours at a temperature below reflux. The reaction mixture is cooled to room temperature, and the residual hydrazine removed by evaporation. The residue is treated with 500 ml. of methanol to extract the product. After separating the extractant and washing the residue with small amount of methanol, the combined extractant-filtrate is treated with hydrogen chloride gas. The solution is then treated with ether to give a crystalline product which is recrystallized from methanol to give 4-allylamino-3-hydrazinopyridazine dihydrochloride.

Following the above procedure, but using an equivalent amount of 4-amino-3-chloro-6-hydrazinopyridazine,
4-ethylamino-3-chloro-6-hydrazinopyridazine,
4-phenylamino-3-chloro-6-hydrazinopyridazine or
4-benzylamino-3-chloro-6-hydrazinopyridazine prepared according to the procedure of Step A of Example 2 or 4-allylamino-6-chloro-3-hydrazinopyridazine,
4-amino-6-chloro-3-hydrazinopyridazine,
4-ethylamino-6-chloro-3-hydrazinopyridazine,
4-phenylamino-6-chloro-3-hydrazinopyridazine, or
4-benzylamino-6-chloro-3-hydrazinopyridazine prepared according to the procedure of Step B of Example 1 in place of the 4-allylamino-3-chloro-6-hydrazinopyridazine used therein, there is obtained the dihydrochloride salt of 4-amino-3-hydrazinopyridazine,
4-ethylamino-3-hydrazinopyridazine,
4-phenylamino-3-hydrazinopyridazine,
4-benzylamino-3-hydrazinopyridazine,
5-allylamino-3-hydrazinopyridazine,
5-amino-3-hydrazinopyridazine,
5-ethylamino-3-hydrazinopyridazine,
5-phenylamino-3-hydrazinopyridazine or
5-benzylamino-3-hydrazinopyridazine, respectively.

Step B.—8-allylamino - 3 - amino-s-triazolo-[4,3-b]-pyridazine hydrochloride: Following the procedure of Step C of Example 1 but using an equivalent amount of the dihydrochloride salt of 4-allylamino-3-hydrazinopyridazine,
4-amino-3-hydrazinopyridazine,
4-ethylamino-3-hydrazinopyridazine,
4-phenylamino-3-hydrazinopyridazine,
4-benzylamino-3-hydrazinopyridazine,
5-allylamino-3-hydrazinopyridazine,
5-amino-3-hydrazinopyridazine,
5-ethylamino-3-hydrazinopyridazine,
5-phenylamino-3-hydrazinopyridazine or
5-benzylamino-3-hydrazinopyridazine in place of the 4-allylamino-6-chloro-3-hydrazinopyridazine dihydrochloride used therein, there is obtained 8-allylamino-3-amino-s-triazolo-[4,3-b]-pyridazine hydrochloride,
3,8-diamino-s-triazolo-[4,3-b]-pyridazine hydrochloride,
3-amino-8-ethylamino-s-triazolo-[4,3-b]pyridazine hydrochloride,
3-amino-8-phenylamino-s-triazolo-[4,3-b]-pyridazine hydrochloride,
3-amino-8-benzylamino-s-triazolo-[4,3-b]-pyridazine hydrochloride,
7-allylamino-3-amino-s-triazolo-[4,3-b]-pyridazine hydrochloride,
3,7-diamino-s-triazolo-[4,3-b]-pyridazine hydrochloride,
3-amino-7-ethylamino-s-triazolo-[4,3-b]-pyridazine hydrochloride,
3-amino-7-phenylamino-s-triazolo-[4,3-b]-pyridazine hydrochloride or
3-amino-7-benzylamino-s-triazolo-[4,3-b]-pyridazine hydrochloride, respectively.

What is claimed is:
1. A compound of the formula

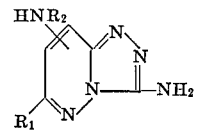

where
$R_1$ is hydrogen or halo having an atomic weight of about 35 to 80; and
$R_2$ is hydrogen, lower alkyl, lower alkenyl, or

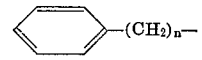

where $n$ is 0, 1 or 2,
and pharmaceutically acceptable acid addition salts thereof.

2. The compound of claim 1 is 8-allylamino-3-amino-6-chloro-s-triazolo-[4,3-b]-pyridazine.

3. A process for preparing the compounds of claim 1 which comprises treating a compound of the formula

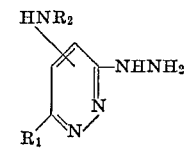

with a compound of the formula XCN in an acidic hydroxylic solvent, where
X is halo having an atomic weight of about 35 to 80; and
$R_1$ and $R_2$ are as defined in claim 1.

References Cited
UNITED STATES PATENTS

| | | | |
|---|---|---|---|
| 3,079,392 | 2/1963 | Pesson | 260—250 A |
| 3,096,329 | 7/1963 | Steck et al. | 260—250 A |
| 3,483,193 | 12/1969 | Gall et al. | 260—250 A |

NICHOLAS S. RIZZO, Primary Examiner

U.S. Cl. X.R.
424—250